United States Patent
Audibert et al.

[11] Patent Number: 5,720,347
[45] Date of Patent: Feb. 24, 1998

[54] PROCESS AND WATER-BASE FLUID UTILIZING HYDROPHOBICALLY MODIFIED GUARS AS FILTRATE REDUCERS

[75] Inventors: Annie Audibert, Le Vesinet; Jean-François Argillier, Suresnes, both of France

[73] Assignee: Institut Francais du Petrole, Rueil Malmaison, France

[21] Appl. No.: 584,433

[22] Filed: Jan. 11, 1996

[30] Foreign Application Priority Data

Jan. 10, 1995 [FR] France ............... 95 00423

[51] Int. Cl.$^6$ ............................. E21B 33/138
[52] U.S. Cl. ............................. 166/294; 175/72
[58] Field of Search .............. 166/275, 294, 166/295; 175/72

[56] References Cited

U.S. PATENT DOCUMENTS

| | | | |
|---|---|---|---|
| 3,615,794 | 10/1971 | Niemerick | 166/294 X |
| 3,740,360 | 6/1973 | Nimerick | 260/17.4 |
| 3,763,934 | 10/1973 | Coulter, Jr. et al. | 166/294 |
| 3,766,984 | 10/1973 | Niemerick | 166/294 |
| 4,529,523 | 7/1985 | Landoll | 166/225 X |
| 4,620,596 | 11/1986 | Mondshine | 175/72 X |
| 4,960,876 | 10/1990 | Molteni et al. | 536/114 |

*Primary Examiner*—William P. Neuder
*Attorney, Agent, or Firm*—Millen, White, Zelano, & Branigan, P.C.

[57] ABSTRACT

In a drilling well, well completion, or well workover, the permeability of the walls is controlled by adding a predetermined amount of at least one hydrophobically modified guar gum derivative, e.g., a hydrophobically modified hydroxypropyl guar (HMPG), so as to reduce the amount of filtrate lost through the walls. The fluid may also include viscosifiers such as polymers or reactive clay.

22 Claims, No Drawings

PROCESS AND WATER-BASE FLUID UTILIZING HYDROPHOBICALLY MODIFIED GUARS AS FILTRATE REDUCERS

FIELD OF THE INVENTION

The present invention relates to operations performed in order to develop underground reservoirs containing hydrocarbons. More particularly, the invention describes a process for controlling the filtration losses of a drilling, a completion or a workover fluid run in a well drilled through geologic formations.

BACKGROUND OF THE INVENTION

Conventional well drilling, completion or workover techniques in these wells comprise the circulation of a fluid injected towards the well bottom through a string of tubes making up the drill string or the production string, the fluid flowing up towards the surface in the annulus defined by the walls of the well and the outside of the string of tubes. During the upflow, a certain amount of fluid enters the porous or fractured geologic formations. This lost amount of fluid is referred to as filtration loss or filtrate. It is generally desirable to limit the amount of filtrate because it represents a costly products consumption, additional conditioning operations in the mud conditioning plant and also risks of destabilization of the well walls or of clogging of the producing or potentially producing geologic zones.

Many filtrate reducing products for water-base fluids, drilling fluids, completion fluids or workover fluids, are known in the profession. The use of organic polymers such as starch or CMC (carboxymethylcellulose) can for example be cited. Document U.S. Pat. No. 4,960,876 describes a process for obtaining a polymer derived from hydrophobically modified guar gum having suspension viscosifying or stabilizing capacities.

SUMMARY OF THE INVENTION

The present invention thus relates to a process used in a well drilled through at least one geologic formation having a given permeability. At least one of the following operations is performed: well drilling, well completion, well workover, and the permeability of the walls of said well drilled in said formation is controlled by adding a predetermined amount of at least one hydrophobically modified guar gum derivative (HMG). In a variant, the guar gum derivative is hydrophobically modified hydroxypropyl guar (HMPG).

The modified guar gum can include a hydrophobic alkyl radical having between 10 and 32 atoms of carbon and preferably between 18 and 28.

The molecular mass of the modified guar gum can be less than 2,000,000 daltons and it preferably ranges between 50,000 and 1,600,000 daltons.

In the process, the fluid can contain between 0.5 and 30 grams per liter of hydrophobically modified guar gum and preferably between 1 and 15 g/l.

The fluid can contain at least one polymer selected from the group consisting of xanthan, scleroglucan, wellan, gellan, hydroxyethylcellulose (HEC), CMC, guar gum, the polyacrylamides and their anionic derivatives.

The invention further relates to a water-base fluid intended for well drilling, completion or workover, containing a predetermined amount of at least one hydrophobically modified guar gum derivative. The filtrate of this fluid is controlled by adding a predetermined amount of at least one hydrophobically modified guar gum derivative (HMG). In a variant, the guar gum derivative is hydrophobically modified hydroxypropyl guar (HMPG).

The viscosity of the fluid can be mainly controlled by adding at least one polymer selected from the group consisting of xanthan, scleroglucan, wellan, gellan, hydroxyethylcellulose (HEC), CMC, guar gum, the polyacrylamides and their anionic derivatives.

The fluid can contain at least one electrolyte at concentrations which can reach saturation.

The electrolyte can be selected from the group consisting of sodium, potassium, calcium, magnesium and zinc chloride, bromide, carbonate, acetate, formate, insofar as they constitute soluble salts.

The fluid can contain between 0.5 and 30 g/l of HMG and between 0.5 and 20 g/l of viscosifying polymer.

The fluid can contain between 0.5 and 10 g/l of HMG, between 2 and 4 g/l of viscosifying polymer, preferably xanthan, between 10 and 100 g/l of KCl or NaCl and between 0 and 30 g/l of reactive clay.

Hydrophobically modified guar gum derivatives mainly derive from the guar gum derivatives that are conventionally used, such as hydroxyethyl or hydroxypropyl guar, cationic guar or depolymerized guar gum. These derivatives can be chemically modified through the incorporation of alkyl groups by chemical reaction affecting certain glycoside units. These hydrophobically modified guar gum derivatives are described in document U.S. Pat. No. 4,960,876.

Guar gum is a natural polymer made up of D-mannose monomer units linked to each other by $\beta$ 1–4 bonds in order to form the main chain with which D-galactose units are linked by $\alpha$ 1–6 bonds. This derivative is conferred a function by reaction of an epoxyalkyl in basic medium according to the process described in document U.S. Pat. No. 4,960,876 allowing the grafting of 0.01 to 2% of $C_{22}$ to $C_{28}$ epoxyalkyl functions.

The hydrosoluble guar gum HMG can be prepared from a guar gum derivative through the chemical incorporation of a long epoxyalkyl chain between $C_{10}$ and $C_{32}$, preferably between 18 and 28 atoms of carbon for the hydrophobic unit.

The proportion of hydrophobic units can range from 0.01 to about 5%.

The polymer HMG can have a total hydrophilic unit molar substitution rate of at least 0.7, and an average between 0.7 and 4, between 0.0001 and 0.02 of hydrophobic substituents per anhydroglycoside unit, and a hydrophilic to hydrophobic substituents molar ratio ranging between 35/1 and 40,000/1. The hydrophilic unit can be of the hydroxyethyl, hydroxypropyl, hydroxybutyl type, or a carboxy or amine substituent. The hydrophobic unit can be of the alkyl, alkylenyl type, linear or branched, comprising 10 to 32 atoms of carbon.

The polymer according to the invention comprising hydroxypropyl hydrophilic units is called HMPG.

The applicant has established that the polymer HMG defined above has good qualities for controlling the filtration of a drilling, a completion or a workover fluid, all fluids whose continuous liquid phase is aqueous. The fluid circulating or set by circulation in the well can contain viscosifiers based on reactive clays and/or polymers of a specific nature for fulfilling notably the function of a viscosifier.

A well completion fluid is a fluid displaced in a well to be set in a production well. During its displacement or its setting, this fluid is in contact, during a more or less long time, with the producing or potentially producing geologic formation. This also applies to a workover fluid.

The physical and/or chemical characteristics of these fluids are controlled and adjusted according to the nature of the geologic formation and of the effluents present, to the bottomhole conditions and to the various functions which can be fulfilled by such fluids, for example cleaning, stabilization, pressures control, etc. Furthermore, these fluids must not, as far as possible, modify the productivity of the geologic productive series. These types of fluids therefore preferably contain no or few solids, although in some cases the presence of reactive or inert solids is inevitable. In any case, filtration control is a very important parameter.

The fluids according to the present invention can also be set or displaced in the well in the form of a "spacer" or volume of fluid displaced by another fluid of different composition, or inserted between two other fluids.

A variant of the invention relates to fluids intended for so-called slim hole drilling or for highly slanted drilling. These fluids, intended for the above-cited applications, are preferably determined to exhibit the following characteristics:

- have a low viscosity at high shear rates, in order to reduce the pressure drops,
- form a gel at rest in order to keep the cuttings in suspension during circulation stops,
- contain a maximum percentage of solids which may tend to form deposits or amalgams notably under the action of the centrifugation caused by the rotation of the drillpipe string in a hole of small diameter in relation to the dimension of the drillpipe string, or under the action of gravity in the case of horizontal wells. Now, without a solid or with very few solids in comparison with conventional drilling, it is well-known that filtration control is very delicate.

Fluids circulating under such particular conditions thus contain generally practically no reactive clayey colloids as base viscosifiers, but specific polymers. It is well-known that these fluids, called "solid-free" fluids or "without solid supply", pose problems in obtaining good filtration characteristics, particularly at average or high temperatures, with conventional filtrate-reducing products. On the other hand, the HMG used according to the present invention exhibits good capacities for controlling the filtration, particularly in combination with certain viscosifying polymers, all the more so since the temperature increases. This is generally not the case for the natural polymer derivatives that are conventionally used as filtrate reducers in drilling or completion fluid formulations.

The following tests establish the characteristics of the HMG under various conditions of use and according to conventional test procedures. The polymer tested is HMPG, a product currently available on the market for various applications, notably paper, paint, and whose molecular mass is estimated between 50,000 and 1,600,000. The filtration tests have been carried out according to the API (American Petroleum Institute) standards in force: API RP23 B1 section 3—Filtration—June 1990. The filtrates are expressed in milliliters (ml), the plastic viscosity VP in mPa.s, the yield value YV in lb/100 ft$^2$ (to be multiplied by 0.4788 to express YV in Pa) and the cake thickness is expressed in millimeters.

Various fluid formulations have been tested, with or without addition of weighting materials of the barite type, the viscosifier being generally a polysaccharide of the xanthan or of the scleroglucan type.

The formulations according to the invention have been compared with conventional formulations containing filtrate reducers known in the profession, such as low viscosity CMC (carboxymethylcellulose) which can be currently considered to be one of the best products available with, for certain applications, HEC (hydroxyethylcellulose) or PAC (polyanionic cellulose) whose molecular mass is higher than that of the CMC, guar gum, a precursor of the hydrophobically modified guar gum.

Test No. 1

Comparison of the efficiency of HMPG with conventional filtrate reducers, for different fluid densities Conditions: API standard, ambient temperature (25° C.)
Base formulation FB: xanthan 2 g/l, KCl 50 g/l.

| Additive to FB | 30 mn filtrate | VP | YV | Cake |
|---|---|---|---|---|
| d = 1.03-barite 30 g/l | | | | |
| Low vis. CMC 10 g/l | 10 | 8 | 5 | <1 |
| Guar 2 g/l | 11.4 | 7 | 6 | 0.5 |
| HMPG 2 g/l | 14.8 | 6 | 7 | <1 |
| HMPG 4 g/l | 12.3 | 11 | 14 | <1 |
| d = 1.2-barite 210 g/l | | | | |
| Low vis. CMC 10 g/l | 5.8 | 14 | 3 | <1 |
| HMPG 2 g/l | 10.6 | 7 | 9 | <1 |

The xanthan of IDVIS make and the low viscosity CMC used are respectively marketed by the DOWELL-IDF and Aqualon companies.

Notes

For the low-density formulation, the filtration characteristics in the presence of HMPG are of the same order of magnitude as those of the low viscosity CMC, which is currently considered to be one of the best products available.

The addition of barite to the formulation studied above allows to increase the density of the fluid up to 1.2. The 30' filtrate is then low (~10 ml). By comparison, a CMC-based formulation also gives a low filtrate (~6 ml) but with a high plastic viscosity (14).

Test No. 2

Influence of temperature for different fluid densities

Conditions: API standard, in a HP/HT test cell with a pressure of 35 bars and a back-pressure of 15 bars.
Base formulation FB: Xanthan 2 g/l, KCl 50 g/l

| Additive to FB | 30 mn filtrate | Cake |
|---|---|---|
| a) Filtration temperature: 90° C. and d = 1.03 (barite 30 g/l) | | |
| Low vis.CMC 10 g/l | 19.4 | ~1.5 |
| Guar 2 g/l | 51.5 | <2 |
| HMPG 2 g/l | 44.8 | 1.5 |
| b) Filtration temperature: 120° C. and d = 1.03 (barite 30 g/l) | | |
| Low vis. CMC 10 g/l | >250 | — |
| Guar 2 g/l | 124.5 | <2 |
| HMPG 2 g/l | 69.8 | ~1.5 |

The formulation containing the low-viscosity CMC degrades during the heating period before the temperature filtration (about 2 hours) and no cake formation is observed under such conditions.

| Additive to FB | 30 mn filtrate | Cake |
|---|---|---|
| c) Filtration temperature: 90° C. and d = 1.2 (barite 210 g/l) | | |
| Low vis. CMC 10 g/l | 20.6 | no resistance |
| HMPG 2 g/l | 22.7 | ~8 |
| d) Filtration temperature: 120° C. and d = 1.2 (barite 210 g/l) | | |
| Low vis. CMC 10 g/l | ∞ | — |
| HMPG 2 g/l | 28.8 | <9 |

Notes

The temperature increase generally leads to a reinforcement of the hydrophobic interactions. A better reduction of the filtrate of the HMPG is observed under the effect of the temperature. It can be noted that, at 120° C., one of the best filtrate reducers that are currently offered degrades under the effect of the temperature. Furthermore, at 90° C., the quality of the cake formed is very low and the cake has no mechanical resistance. This is confirmed by test No. 3.

Test No. 3

Influence of temperature aging (120° C.)

Condition: In a HP/HT test cell with a pressure of 35 bars and a back-pressure of 15 bars, but after a 16-hour aging at a temperature of 120° C.

Base formulation FB: Xanthan 2 g/l, KCl 50 g/l

| Filtration temperature: 120° C. and d = 1.03 (barite 30 g/l). | | | | |
|---|---|---|---|---|
| Additive to FB | 30 mn filtrate | VP | YV | Cake |
| Lo vis. CMC 10 g/l | ∞ | 8 | 5 | |
| HMPG 2 g/l | 69.8 | 6 | 7 | ~1.5 |
| HMPG 2 g/l (*) | 71.6 | 6 | 6 | ~2 |

(*) after aging

Notes

The plastic viscosity and yield values given in the previous table correspond to the characteristics of the formulations prior to filtration, which are similar for the three formulations.

It can thus be observed that the properties of the HMPG-based formulation are maintained even after aging in terms of filtration as well as in terms of rheological properties.

Test No. 4

Formulations with solids

Conditions: API standard, ambient temperature (30° C.).
Base formulation FB: Green Bond clay 30 g/l, NaCl 10 g/l

| Additive to FB | 30 mn filtrate | VP | YV | Cake |
|---|---|---|---|---|
| 1) without additive | 36.5 | 9.5 | — | 2.8 |
| 2) CMC 3 g/l | 13 | | | 1.5 |
| 3) Xanthan 2 g/l and HMPG 2 g/l | 11.8 | 25 | 39 | 2.5 |

Notes

A certain amount of clay can be used in association, for example, with xanthan. The filtrate level obtained remains low.

The various tests of the present description confirm that the fluid formulations suited to well drilling, completion or workover, which preferably contain a viscosifying polymer in aqueous solution, possibly reactive and/or inert solid particles, can have good filtration characteristics by using an efficient amount of HMG as a filtrate reducer. It is well-known that filtrate reducing polymers such as CMC or HEC disperse and homogenize the suspension by adsorption on the solid particles, while making them more negative and thus more repellent. The filtration of this homogeneous suspension then leads to the formation of a cake having a rather regular structure and consequently relatively impermeable. Besides, the permeability of the cake can be further decreased by a free polymer which gels in the pores of the cake.

The polymer HMG notably fulfills such a function or an equivalent function. However, the particular structure of the HMG and for example of the HMPG of the present invention is also likely to form an ordered three-dimensional structure without requiring, in order to form a cake of low permeability, a solid particles support such as clay or barite. Furthermore, the temperature stability of the HMG structure allows its application in the fields of interest of the profession, in particular in high temperature wells. The advantages and the functions of the HMG are found in the polymers of this class for molecular masses less than about 2,000,000 daltons.

Within the scope of specific applications in which the fluids contain practically no reactive solids, for example slim hole or slant drilling applications, completion or workover fluids, the association of HMG as a filtrate reducer associated with a viscosifying polymer, xanthan for example, gives the fluids good filtration characteristics even at high temperatures.

We claim:

1. A water-base fluid intended for drilling, well completion or well workover, comprising a predetermined amount of hydrophobically modified guar gum derivative (HMG) and at least one viscosifying polymer selected from the group consisting of xanthan, scleroglucan, gellan, wellan, hydroxyethylcellulose (HEC), CMC, guar gum, a polyacrylamide and an anionic derivative of the polyacrylamide, said HMG containing 0.01–5% of grafted hydrophobic chains of epoxyalkyl units containing 10–32 carbon atoms per anhydroglycoside unit.

2. A fluid as claimed in claim 1, characterized in that said guar gum derivative is hydrophobically modified hydroxypropyl guar (HMPG).

3. A fluid as claimed in claim 1, comprising at least one electrolyte at concentrations up to saturation.

4. A fluid as claimed in claim 3, wherein said electrolyte is a soluble salt selected from the group consisting of sodium, potassium, calcium, magnesium and zinc chlorides, bromides, carbonates, acetates, and formates.

5. A fluid as claimed in claim 1, comprising between 0.5 and 30 g/l of HMG and between 0.5 and 20 g/l of said viscosifying polymer.

6. A fluid as claimed in claim 1, comprising between 0.5 and 10 g/l of HMG, between 2 and 4 g/l of said viscosifying polymer, between 10 and 100 g/l of KCl or NaCl and between 0 and 30 g/l of reactive clay.

7. A fluid as claimed in claim 6, wherein the viscosifying polymer is xanthan.

8. A fluid according to claim 1, wherein said HMG derivative is substituted by a hydrophilic unit selected from the group consisting of hydroxyethyl, hydroxypropyl, hydroxybutyl carboxyl and amino and mixtures thereof, said HMG derivative having a total hydrophilic unit molar substitution of at least 0.7, between 0.0001 and 0.02 hydrophobic unit per anhydroglucose unit, and a hydrophilic unit to hydrophobic unit molar ratio of 35:1 to 40,000:1.

9. A fluid according to claim 8, wherein the hydrophilic unit is hydroxypropyl.

10. In a process involving a well drilled through at least one geologic formation having a known permeability, the improvement comprising adding a predetermined amount of at least one hydrophobically modified guar gum derivative (HMG) to a volume of water-based fluid displaced in the well during said process, in order to control the permeability of a wall of said well drilled in said formation, and limit the amount of filtrate, said HMG containing 0.01–5% of grafted hydrophobic chains of epoxyalkyl units containing 10–32 carbon atoms per anhydroglycoside unit.

11. A process as claimed in claim 10, wherein said HMG derivative is substituted by a hydrophilic unit selected from the group consisting of hydroxyethyl, hydroxypropyl, hydroxybutyl carboxyl and amino and mixtures thereof, said HMG derivative having a total hydrophilic unit molar substitution of at least 0.7, between 0.0001 and 0.02 hydrophobic unit per anhydroglucose unit, and a hydrophilic unit to hydrophobic unit molar ratio of 35:1 to 40,000:1.

12. A process as claimed in claim 10 wherein the molecular mass of the hydrophobically modified guar gum is less than 2,000,000 daltons.

13. A process according to claim 12, wherein the molecular mass ranges between 50,000 and 1,600,000 daltons.

14. A process as claimed in claim 10, wherein said fluid contains between 0.5 and 30 grams per liter of hydrophobically modified guar gum.

15. A process as claimed in claim 14, wherein said fluid contains between 1 and 15 g/l of said hydrophobically modified guar gum.

16. A process according to claim 10, wherein the epoxyalkyl units contain between 18 and 28 carbon atoms.

17. A process as claimed in any one of claim 10, wherein in that said fluid contains at least one viscosifying polymer selected from the group consisting of xanthan, scleroglucan, wellan, gellan, hydroxyethylcellulose (HEC), CMC, guar gum, a polyacrylamide, and an anionic derivative of the polyacrylamide.

18. A process according to claim 17, wherein said fluid contains at least one electrolyte at concentrations up to saturation.

19. A process according to claim 18, wherein said electrolyte is a soluble salt selected from the group consisting of sodium, potassium, calcium, magnesium and zinc chlorides, bromides, carbonates, acetates, and formates.

20. A process according to claim 19, comprising between 0.5 and 10 g/l of HMG, between 2 and 4 g/l of said viscosifying polymer, between 10 and 100 g/l of KCl or NaCl and between 0 and 30 g/l of reactive clay.

21. A process according to claim 20, wherein said viscosifying polymer is xanthan.

22. A process according to claim 17, comprising xanthan, scleroglucan, wellan, gellan, hydroxyethylcellulose (HEC), CMC, guar gum, a polyacrylamide, and an anionic derivative of the polyacrylamide.

* * * * *